United States Patent [19]
Groen et al.

[11] 3,843,659
[45] *Oct. 22, 1974

[54] PROCESS FOR THE PREPARATION OF PIPERIDINES

[75] Inventors: Siemen H. Groen; Johannes J. M. Deumens, both of Geleen; Petrus A.M.J. Stijfs, Oirsbeek, all of Netherlands

[73] Assignee: Stamicabon B.V., Galeen, Netherlands

[ * ] Notice: The portion of the term of this patent subsequent to Apr. 17, 1990, has been disclaimed.

[22] Filed: Mar. 9, 1971

[21] Appl. No.: 122,522

[30] Foreign Application Priority Data
Mar. 12, 1970  Netherlands .................... 7003508

[52] U.S. Cl............................ 260/293.52, 260/583 P
[51] Int. Cl............................................ C07d 29/06
[58] Field of Search .............................. 260/293.52

[56] References Cited
UNITED STATES PATENTS
2,790,804   4/1957   Silverstone ...................... 260/293.2
FOREIGN PATENTS OR APPLICATIONS
1,068,719   11/1959   Germany ...................... 260/293.52
1,200,821   9/1965   Germany ...................... 260/293.52

OTHER PUBLICATIONS
Paden et al., J. Am. Chem. Soc. 58, 2487, (1936).

Primary Examiner—John D. Randolph
Assistant Examiner—G. Thomas Todd
Attorney, Agent, or Firm—Cushman, Darby & Cushman

[57] ABSTRACT

Piperidines and C-substituted piperidines are prepared by cyclization through hydrogenation of N-substituted 4-cyanoaldimines with the recovery of a primary amine having the same substituent as the N-atom of the aldimine in the disclosed process. The primary amine recovered is used in the synthesis of aldimines.

6 Claims, No Drawings

PROCESS FOR THE PREPARATION OF PIPERIDINES

The present invention relates to a cyclization reaction in which piperidine or a C-substituted piperidine is obtained as reaction product and more specifically to the hydrogenation of an N-substituted 4-cyanoaldimine with the subsequent production of a primary amine.

It is known that hydrogenation of 4-cyano-2,2-dimethylbutyraldehyde in the absence of ammonia gives a high yield of 3,3-dimethylpiperidine; however, the yield of 3,3-dimethyl-piperidine in the disclosed cyclization reaction decreased considerably if the hydrogenation was carried out in the presence of ammonia. See German Auslegeschrift No. 1,222,931.

It has now been found that, surprisingly, hydrogenation of N-substituted 4-cyanoaldimines yields mainly two reaction products, namely piperidine or a C-substituted piperidine in relatively high yields, and a primary amine in which the N-atom carries the same substituent as the N-atom of the starting aldimine. The following are instances of the products produced by the present process and are representative only. In the hydrogenation of, say, N-cyclohexyl-4-cyanobutyraldimine, piperidine and cyclohexylamine are obtained. Hydrogenation of, say, N-hexyl-4-cyano-2,2-dimethylbutyraldimine yields 3,3-dimethylpiperidine and hexylamine. The formation of non-cyclic secondary amines which would be expected to occur during hydrogenation of N-substituted imines fails to take place altogether, or nearly so in the process disclosed herein.

The present invention consequently provides a process for the preparation of piperidine or a C-substituted piperidine, which is characterized in that an N-substituted 4-cyanoaldimine is subjected to hydrogenation under suitable reaction conditions of temperature and pressure to form piperidine, or an C-substituted piperidine, and the primary amine is recovered from the reaction mixture. Thus the invention described herein is a process for the preparation of piperidine or a C-substituted piperidine comprising reacting a compound of the general formula:

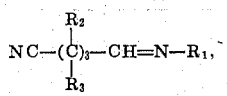

wherein $R_1$, is selected from the group consisting of lower alkyl of one to seven carbon atoms, cycloalkyl, AR-alkyl and aryl; and $R_2$ and $R_3$ are independently selected from the group consisting of hydrogen, lower alkyl of 1–7 carbon atoms;

with hydrogen in the presence of a catalyst to form a primary amine of the general formula:

$$R_1 - NH_2$$

wherein $R_1$ has the significance given above, and the corresponding piperidine or C-substituted piperidine. Of course it will be appreciated that when either of $R_2$ or $R_3$ is other than hydrogen the resulting product will be a C-substituted piperidine. The piperidine or C-substituted piperidine, as the case may be, and the primary amine can be conveniently recovered, for example, by fractional distillation.

The starting product for the preparation of piperidine can be obtained by converting acetaldehyde with a primary amine to a N-substituted acetaldimine and reacting said product with acrylonitrile according to copending application Ser. No. 8,703 filed Feb. 4, 1970, now U.S. Pat. No. 3,708,515, the disclosure of which is hereby incorporated by reference. Briefly described, the preparation of N-substituted acetaldimine follows the general reaction:

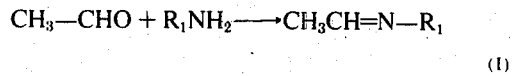

(I)

which is subsequently reacted with acrylonitrile, producing the starting product for the preparation of the piperidine of the present invention, according to the following general reaction:

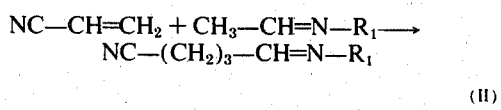

(II)

The present invention proceeds according to the following general reaction wherein both $R_2$ and $R_3$, for illustrative purposes, are hydrogen:

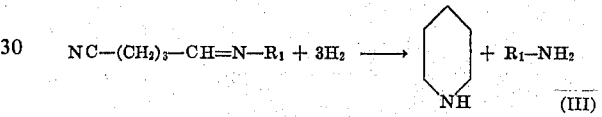

(III)

As will be appreciated, the primary amine obtained from the hydrogenation according to the present invention (reaction III) may then be re-used in the reaction with acetaldehyde (reaction I), so that piperidine can be prepared on the basis of the inexpensive primary starting materials acetaldehyde and acrylonitrile.

The starting product for the preparation of a C-substituted piperidine can be obtained in a known manner according to U.S. Pat. No. 2,768,962, the disclosure of which is hereby incorporated by reference. The starting material for the C-substituted piperidines is prepared from an aldehyde carrying one or two hydrogen atoms on the α-carbon atom, a primary amine and acrylonitrile. The primary amine obtained during the hydrogenation according to the present invention (viz. $R_1-NH_2$) may then also be employed for preparing the starting product concerned. The above two general methods are particularly attractive due to their advantageous application of the $R_1$ substituted amine resulting from the process of the present invention.

The process according to the present invention can be carried out with the aid of various known hydrogenation catalysts, such as, but not limited to, nickel or cobalt on a carrier, Raney nickel, Raney cobalt, Raney-nickel-chromium and catalyst systems containing a metal of the platinum group, such as platinum and palladium. A very suited result can be obtained using Raney nickel or another catalyst of the Raney-type and for this reason these catalysts are preferred.

The process according to the present invention can be carried out either in the absence or in the presence of ammonia. With ammonia absent during the hydrogenation, a N-substituted piperidine carrying the same substituent on the nitrogen atom as is present on the nitrogen atom of the imine is obtained as a by-product.

If desired, said N-substituted piperidine may be recovered as such from the reaction mixture by fractional distillation. It is preferred, however, to carry out the hydrogenation in the presence of ammonia (e.g. 5–20 moles of ammonia per mole of imine) because in that case hardly any N-substituted piperidine is formed. If carried out in the presence of ammonia, the hydrogenation also yields a slight amount of a 1.5 diamine, which can be recovered as such from the reaction mixture by fractional distillation. Said diamines can be converted to piperidines in the known manner according to British Pat. No. 755,534.

The process according to the present invention can be conducted with or without a solvent being present. It is important that the solvent remain inert to both the reactants and the products thus produced. Within these parameters there is a wide variety of suitable solvents. Examples of suited solvents are alkanoles of one to eight carbon atoms, such as methanol, ethanol, propanol and isopropanol, ethers of three to 12 carbon atoms such as diethylether and dioxan and hydrocarbons of five to 12 carbon atoms such as hexane, cyclohexane and decalin. Mixtures of different solvents may also be employed.

Hydrogen is present in the reaction mixture in at least a molar ratio of 3 moles per mole of the imine to be converted, and an excess of hydrogen is preferred.

The hydrogenation according to the present invention can be carried out at atmospheric pressure as well as at elevated pressures. Superatmospheric pressures, e.g. exceeding 300 atmospheres, may be employed. For practical purposes such high pressures are of little importance, however. For economy and correct practice the pressure is preferably maintained between about 1 and about 150 atmospheres.

Like the pressure, the temperature is also subject to wide variance, e.g. from room temperature to temperatures exceeding 250° C. Temperatures between about 35 and about 200° C prove to be very suitable for obtaining optimum results.

The process according to the invention, can be carried out both continuously and discontinuously with application of various known hydrogenation procedures, as will be further elucidated in the following illustrative examples. Unless otherwise indicated, all parts and percentages are by weight.

Example I — Preparation of 3,3-dimethylpiperidine

Raney nickel catalyst (6 g) and methanol (60 ml) are fed into a 1-liter autoclave equipped with a stirrer and a feed line; thereafter liquefied ammonia (81 g) is supplied under pressure. After that, hydrogen is fed into the autoclave to build up a pressure of 60 atmospheres, whereupon the mixture is heated to 120° C. At this temperature, a solution of N-cyclohexyl-4-cyano-2,2-dimethylburyaldimine (60 g) in methanol (140 ml) is added over a period of 3 hours with simultaneous stirring. The feed line is next flushed with methanol (100 ml), and stirring is continued for 1 hour at a temperature of approximately 120° C, then the reaction is allowed to cool.

After being cooled to room temperature the autoclave is opened, the catalyst recovered by filtration and most of the methanol removed by distillation. The gas mixture contains ammonia and hydrogen which is released upon opening of the autoclave when operating on a large scale the gaseous ammonia and hydrogen can be recovered as such and used in a subsequent hydrogenation. This also applies to the ammonia released during distillation of the methanol from the liquid phase.

Mass-spectrometric and gas chromatographic analysis show that the remaining liquid contains cyclohexylamine (28.6 g), 3,3-dimethyl-piperidine (28.7 g) and 1,5-diamino-2, 2-dimethylpentane (2.3 g). Compared with the original quantity of aldimine, this corresponds to a 3,3-dimethylpiperidine efficiency of 87 percent, a 1,5-diamino-2,2-dimethylpentane efficiency of 6 percent and a cyclohexylamine efficiency of 99 percent.

Example II — Preparation of 3,3-dimethylpiperidine

Raney nickel catalyst (4 g) and methanol (25 ml) are fed into a 0.5 liter autoclave provided with a stirrer and a feed line, whereupon liquefied ammonia (53 g) is introduced under pressure. Subsequently, hydrogen is fed in to build up a pressure of 55 atmospheres, after which the mixture is heated to 120° C.

At this temperature, a solution of N-hexyl-4-cyano-2,2-dimethylbutyraldimine (43.7 g) in methanol (70 ml) is added in a period of 1.5 hours with simultaneous stirring. The feed line is then flushed with methanol (100 ml), and stirring is continued for 1 hour at approximately 120° C. Upon completion of the reaction and cooling to room temperature, the autoclave is opened, and the catalyst removed by filtration. The yield is a solution of hexylamine (19.9 g), 3,3-dimethylpiperidine (19.7 g) and 1,5-diamino-2,2-dimethylpentane (2 g) in methanol. Calculated to the amount of starting product, the hexylamine efficiency is 94 percent, the 3,3-dimethylpiperidine efficiency 83 percent, and the 1,5-diamino-2,2-dimethylpentane efficiency 7 percent.

Example III — Preparation of Piperidine

Raney nickel catalyst (4 g) and methanol (25 ml) are fed into a 0.5 liter autoclave provided with a stirrer and a feed line, whereupon liquefied ammonia (54 g) is introduced under pressure. After that, hydrogen is fed in to build up a pressure of 60 atmospheres, whereupon the mixture is heated to 120° C. At this temperature, a solution of N-cyclohexyl-4-cyanobutyraldimine (35.6 g) in methanol (50 ml) is added in a period of 1.5 hours with simultaneous stirring. The feed line is then flushed with methanol (100 ml) and stirring is continued for 2 hours at approximately 120° C.

Upon completion of the reaction and cooling to room temperature the autoclave is opened, the catalyst recovered by filtration and the bulk of the methanol removed by distillation. This leaves a residue of cyclohexylamine (19.4 g) piperidine (13.8 g) and 1.5-diaminopentane (1.5 g) in methanol. Calculated on the amount of starting product, this corresponds to a cyclohexylamine efficiency of 98 percent, a piperidine efficiency of 81 percent, and a 1,5 diaminopentane efficiency of 7.4 percent.

Subsequent fractionation in a distilling apparatus yields 13.3 g of piperidine with a boiling point of 104° – 106° C and 19.0 g of cyclohexylamine with a boiling point of 132° – 135° C in addition to a slight amount of methanol. Upon transfer of the remaining residue to a smaller distilling apparatus and distillation at 174° – 177° C, 1 g of 1,5 diaminopentane is obtained.

Example IV — Preparation of Piperidine

Raney nickel catalyst (5 g) and decalin (30 ml) are fed into a 0.5 liter autoclave provided with a stirrer and a feed line, after which liquefied ammonia (34 g) is introduced under pressure. Hydrogen is then fed into the reactor to build up a pressure of 60 atmospheres, whereupon the mixture is heated to 115° C. At this temperature, a solution of N-cyclohexy-4-cyanobutyraldimine (26.7 g) in decalin (60 ml) is added in approximately 1 hour with simultaneous stirring. The feed line is flushed with decaline (75 ml), and stirring is continued for 2 hours at 120° – 125° C. After cooling to room temperature, the autoclave is opened and the catalyst is removed by filtration as in Example I.

The yield is a solution of 14.7 g of cyclohexylamine, 9.8 g of piperidine and 0.9 g of 1,5-diaminopentane in decalin. Calculated to the original quantity of aldimine, the efficiency as regards cyclohexylamine is 99 percent, the piperidine efficiency 77 percent, and the 1.5 diaminopentane efficiency 6 percent.

EXAMPLE V — PREPARATION OF 3-ETHYLPIPERIDINE

Raney cobalt catalyst (3 g) and ethanol (30 ml) are fed into a 0.5 liter autoclave provided with a stirrer and a feed line, whereupon liquefied ammonia (17 g) is fed in under pressure. Then hydrogen is introduced to build up a pressure of 55 atmospheres, whereupon the mixture is heated to 120° C. At this temperature, a solution of N-cyclohexyl-4-cyano-2-ethylbutyraldimine (20.6 g) in ethanol (75 ml) are added in 1 ½ hours with simultaneous stirring. The feed line is then flushed with ethanol (100 ml) and stirring is continued for 1 hour at approximately 125° C.

The yield is 8.5 g of 3-ethylpiperidine (efficiency: 75 percent), 9.0 g of cyclohexylamine (efficiency: 91 percent), and 0.5 g of 2-ethyl-1,5-diaminopentane (efficiency: 4 percent).

EXAMPLE VI — PREPARATION OF 3,3-DIMETHYLPIPERIDINE

Raney nickel catalyst (3 g) and methanol (25 ml) are fed into a 0.5 liter autoclave provided with a stirrer and a feed line. After that, hydrogen is introduced to build up a pressure of 55 atmospheres, whereupon the mixture is heated to 125°C. At this temperature, a solution of N-hexyl-2,2-dimethyl-4-cyanobutyraldimine (41.6 g) in methanol (70 ml) is added in 1 ½ hours with simultaneous stirring. The feed line is then flushed with methanol (90 ml) and stirring is continued at approximately 120° C for 1 hour. After cooling to room temperature, the autoclave is opened and the catalyst is recovered by filtration.

The yield is a solution of 15.0 g of N-hexylamine, 15.6 g of 3,3-dimethylpiperidine and 8.7 g of 1-hexy-3,3-dimethylpiperidine in methanol. Calculated to the amount of starting product, the hexylamine efficiency is 74 percent, the 3,3-dimethylpiperidine efficiency 69 percent, and the 1-hexyl-3,3-dimethylpiperidine efficiency 22 percent.

EXAMPLE VII — PREPARATION OF 3-PROPYLPIPERIDINE

Raney nickel catalyst (4 g) and methanol (30 ml) are fed into a 0.5 liter autoclave provided with a stirrer and a feed line. After that, hydrogen is introduced to build up a pressure of 65 atmospheres, whereupon the mixture is heated to 110° C. At this temperature, a solution of N-cyclohexyl-4-cyano-2-propylbutyraldimine (22.0 g) in methanol (75 ml) is added in 20 minutes with simultaneous stirring. The feed line is then flushed with methanol (90 ml) and stirring is continued at approximately 110° C. for 2 hours. After cooling to room temperature, the autoclave is opened, the catalyst is recovered by filtration and the bulk of the methanol removed by distillation. The remaining solution contains cyclohexylamine (8.3 g), 3-propylpiperidine (10.0 g) and 1-cyclohexyl-3-propylpiperidine (2.9 g).

Calculated to the original amount of cyanoaldimine, the cyclohexylamine efficiency is 84 percent, the 3-propylpiperidine efficiency 79 percent and the 1-cyclohexyl-3-propylpiperidine efficiency 14 percent.

The products obtained according to the present invention have wide utility, for example, as solvents, as intermediates in the preparation of dyes, ion-exchange resins, medicinals, rubber chemicals, etc. For example, alkyl substituted heterocyclic nitrogen bases can be dehydrogenated to alkenyl substituted heterocyclic nitrogen bases which can then be polymerized, either alone or with copolymerizable monomers to form valuable polymers and the like.

What is claimed:

1. Process for the preparation of piperidine or a C-substituted piperidine comprising reacting a compound of the formula:

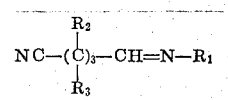

wherein $R_1$ is selected from the group consisting of lower alkyl of 1 – 7 carbon atoms, cycloalkyl, aralkyl and aryl; and $R_2$ and $R_3$ are independently selected from the group consisting of hydrogen, lower alkyl of 1–7 carbon atoms;

with at least 3 moles of hydrogen per mole of imine to be converted, in the presence of a catalyst and in the absence of ammonia to form a primary amine of the formula:

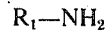

wherein $R_1$ has the significance given above, and the corresponding piperidine or C-substituted piperidine.

2. Process according to claim 1 wherein said reaction is conducted at a pressure of about 1 to 150 atmospheres.

3. Process according to claim 1 wherein said reaction is conducted at a temperature from about 35° to about 200° C.

4. Process according to claim 1 wherein said reaction is carried out in the presence of a solvent.

5. Process according to claim 1 wherein $R_2$ and $R_3$ are both hydrogen and the resulting product is piperidine.

6. Process according to claim 1, wherein $R_1$ is attached to the nitrogen atom of at least a portion of said piperidine or C-substituted piperidine.

* * * * *